United States Patent [19]
Nakamura et al.

[11] Patent Number: 6,056,566
[45] Date of Patent: May 2, 2000

[54] CARD CONNECTOR WITH AN EJECT MECHANISM HAVING AN INCREASED EJECT STROKE

[75] Inventors: Keisuke Nakamura, Akishima; Akira Kimura, Kokubunji, both of Japan

[73] Assignee: Japanese Aviation Electronics Industry, Tokyo, Japan

[21] Appl. No.: 09/267,576

[22] Filed: Mar. 12, 1999

[51] Int. Cl.[7] .................................................. H01R 13/62
[52] U.S. Cl. ........................................... 439/159; 439/152
[58] Field of Search .................................... 439/159, 152, 439/160, 155

[56] References Cited

U.S. PATENT DOCUMENTS

| | | | |
|---|---|---|---|
| 5,795,190 | 8/1998 | Ono | 439/92 |
| 5,871,365 | 2/1999 | Kajiura | 439/159 |
| 5,967,811 | 10/1999 | Yamamoto et al. | 439/159 |
| 5,967,812 | 10/1999 | Tung et al. | 439/159 |
| 5,967,813 | 10/1999 | Ho et al. | 439/162 |

*Primary Examiner*—Steven L. Stephan
*Assistant Examiner*—Son V. Nguyen
*Attorney, Agent, or Firm*—Laff, Whitesel & Saret, Ltd.; J. Warren Whitesel

[57] ABSTRACT

A card connector in a U shape for receiving a card in a slot of the U shape and electrically connecting a connector portion provided in a bridging portion of the U shape with a mating connector portion of the card, has an ejector for ejecting the card from a connecting condition between the connector portion and the mating connector portion. The ejector comprises an eject plate slidably mounted on the card connector and having engaging fingers for pushing the card. A lever is rotatably mounted on the bridging portion and is engaged with the eject plate to permit the eject plate to rotate relatively to the lever so that rotation of the lever makes the eject plate slide to push the card by the fingers. The eject plate and the lever have a stopper which, upon further rotation of the lever, preventing further relative rotation of the eject plate to cause rotation of the eject plate together with the lever so that the card is further moved so as to insure the complete ejection of the card.

7 Claims, 9 Drawing Sheets

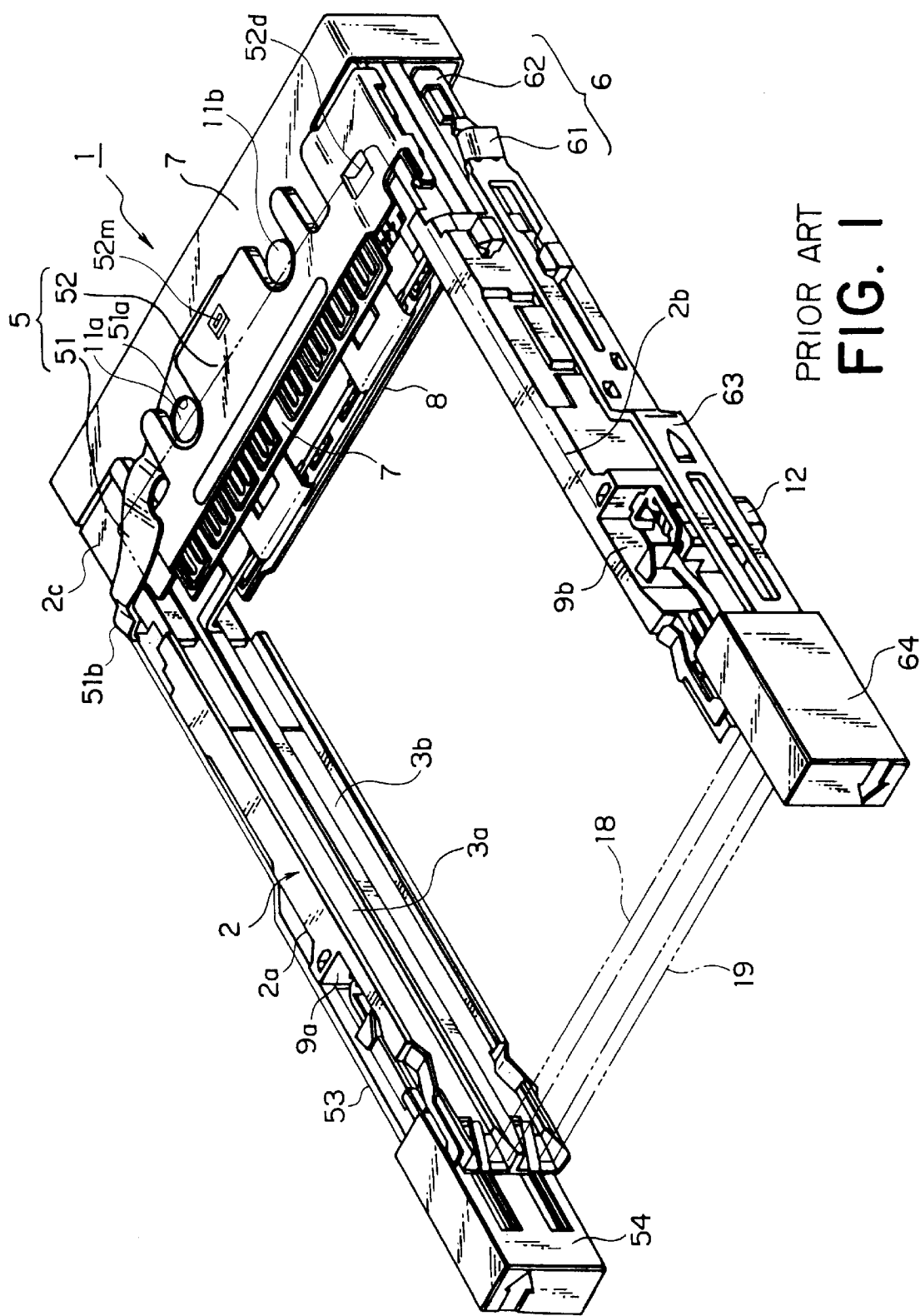
PRIOR ART
FIG. 1

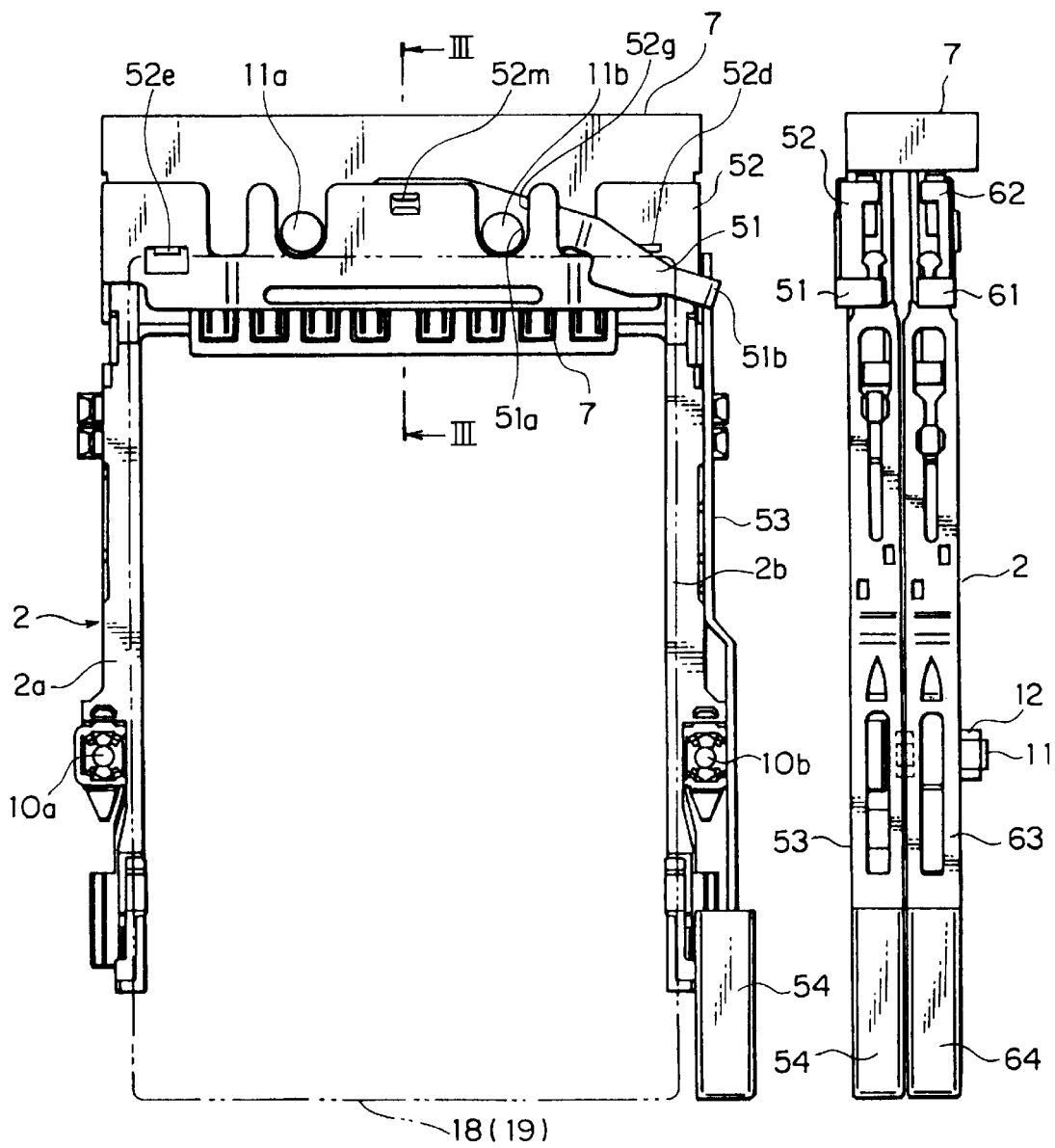
PRIOR ART
FIG. 2A
PRIOR ART
FIG. 2B

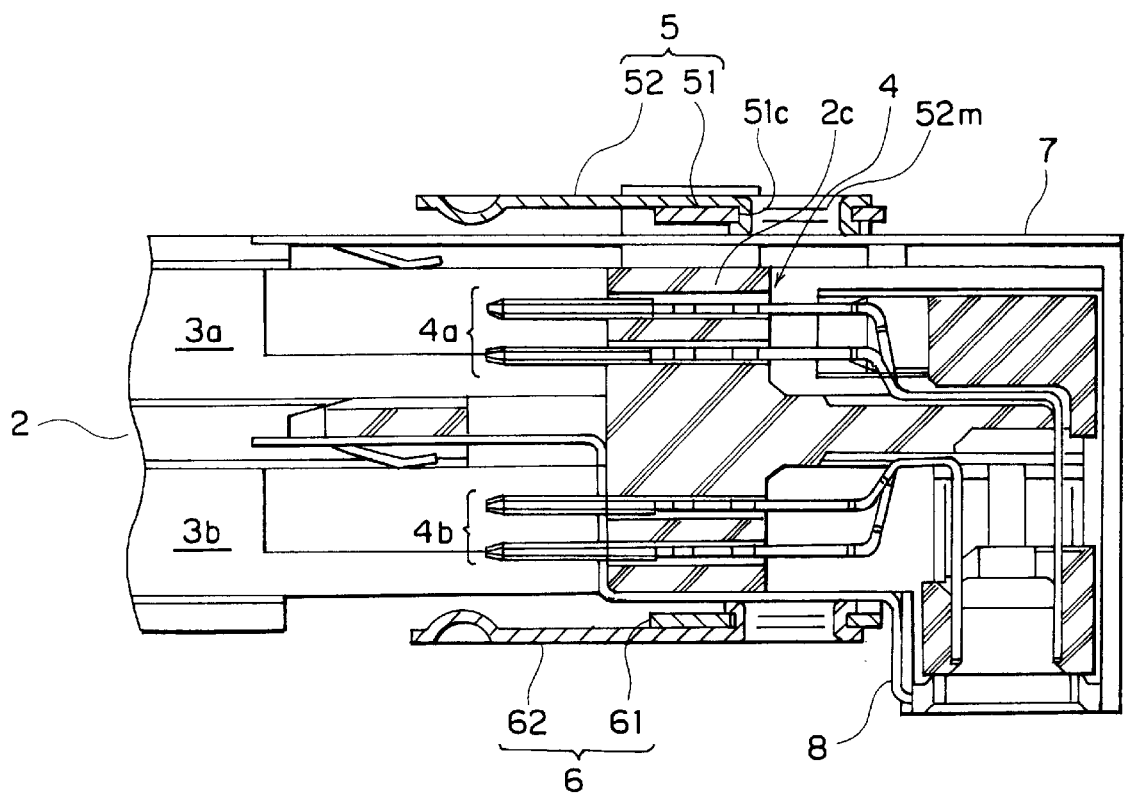
FIG. 3 PRIOR ART

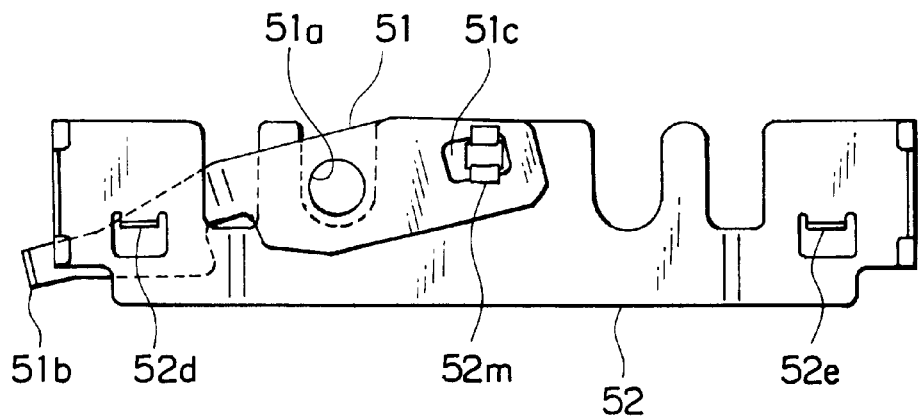
PRIOR ART
FIG. 4
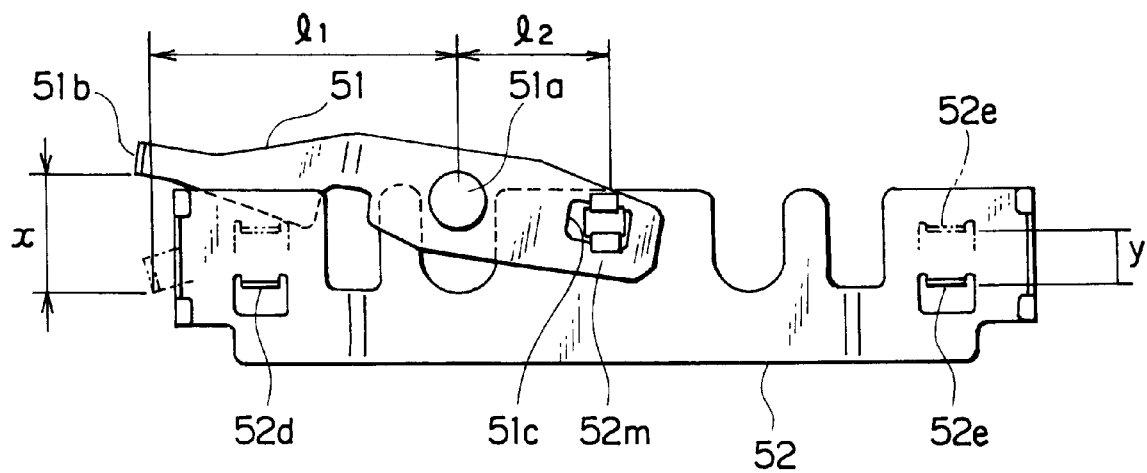
PRIOR ART
FIG. 5

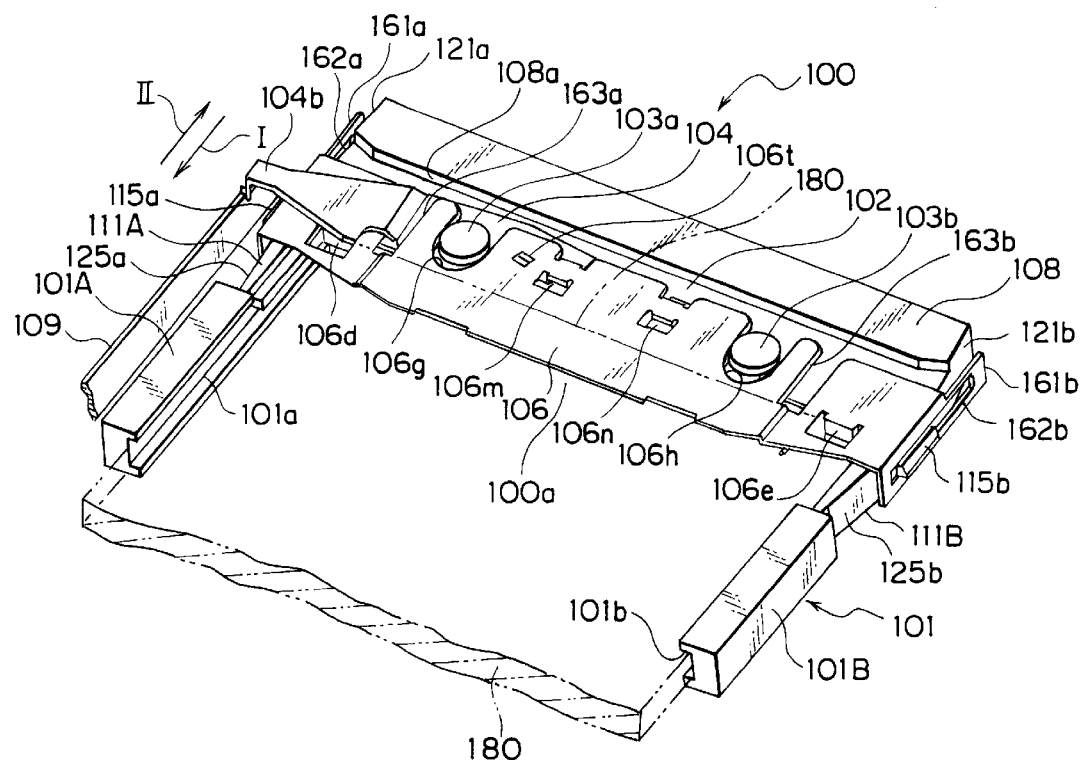
FIG. 6
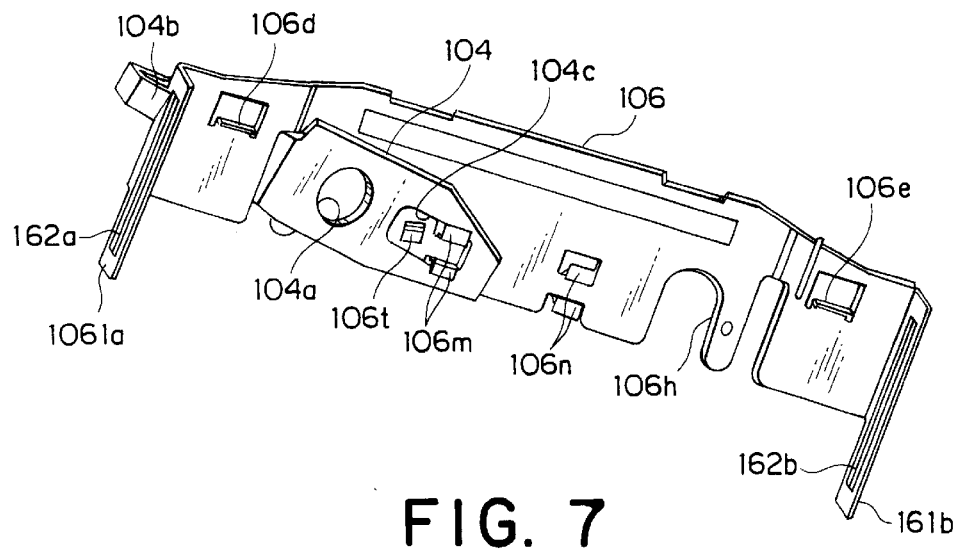
FIG. 7

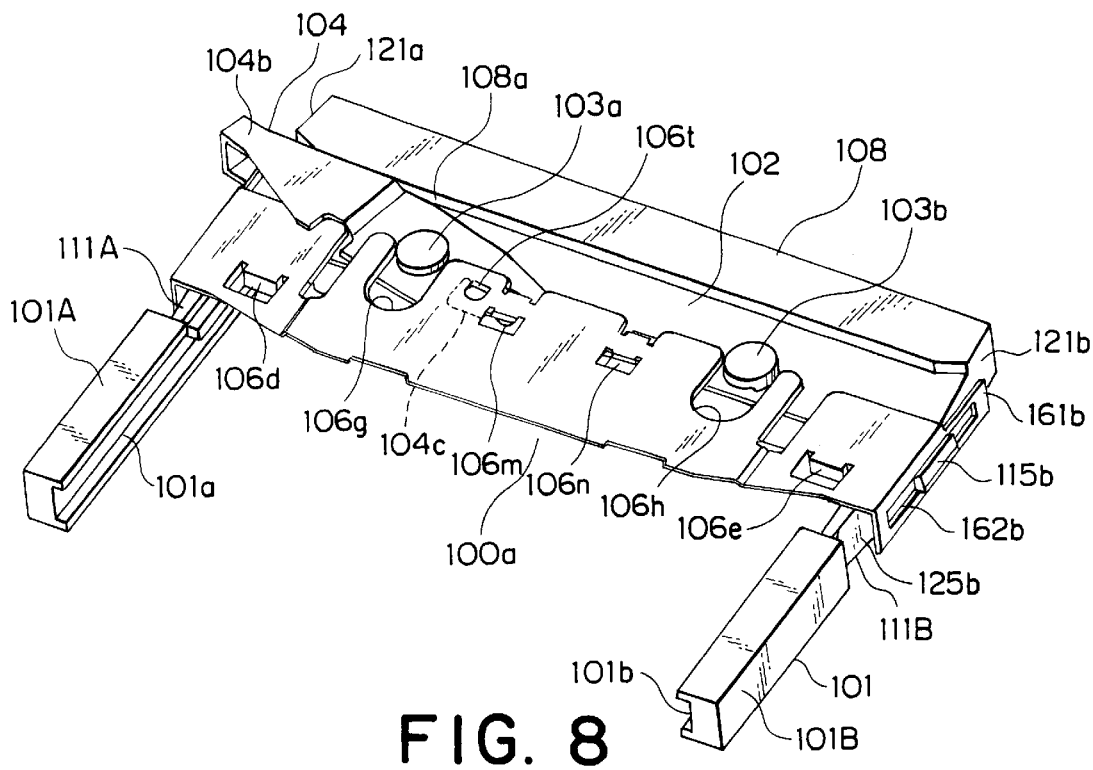
FIG. 8
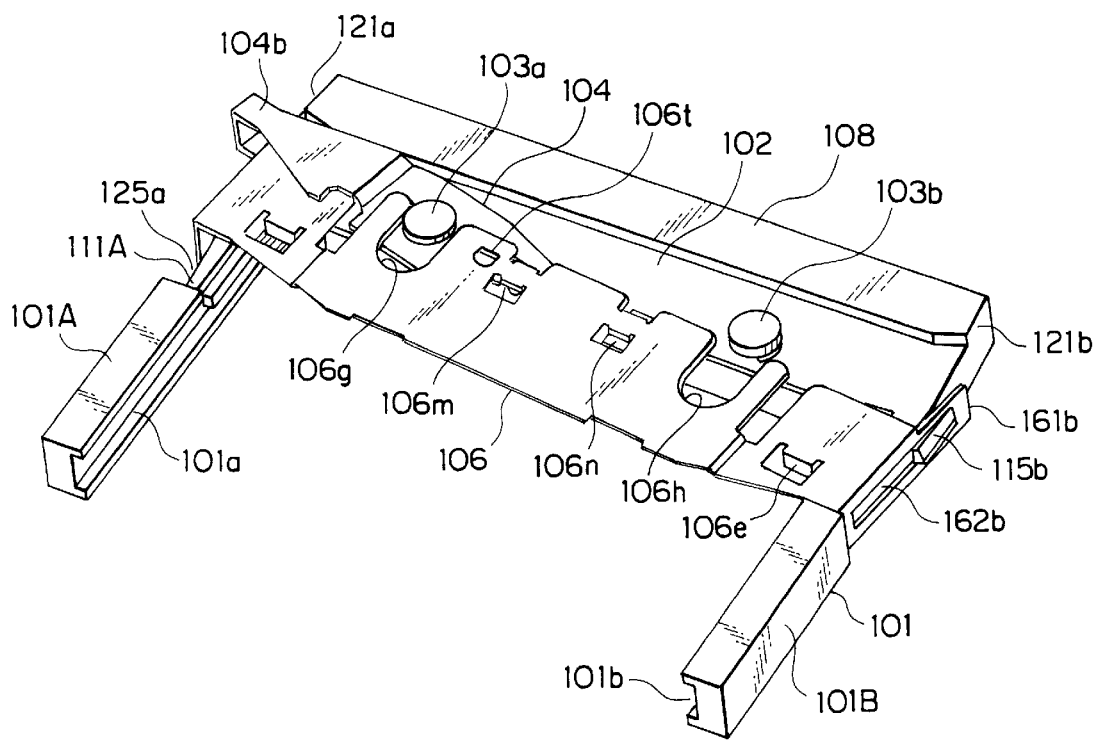
FIG. 9

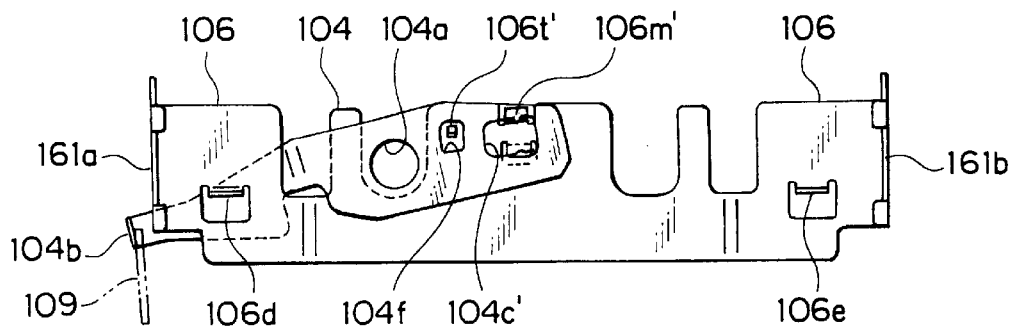
FIG. 10A
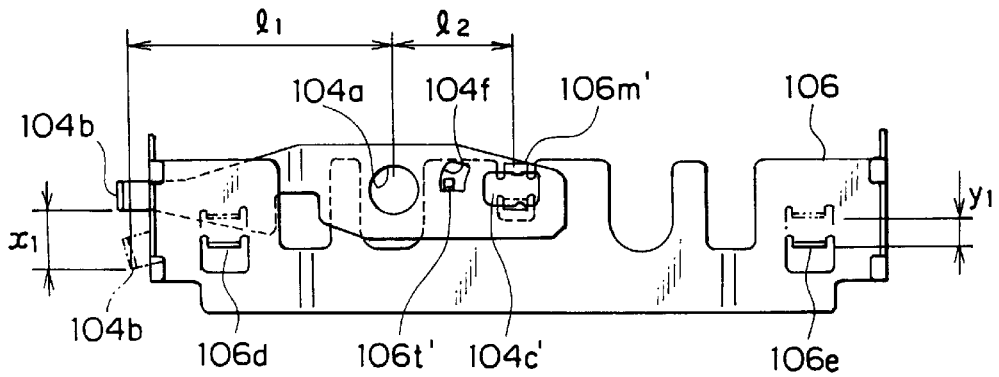
FIG. 10B
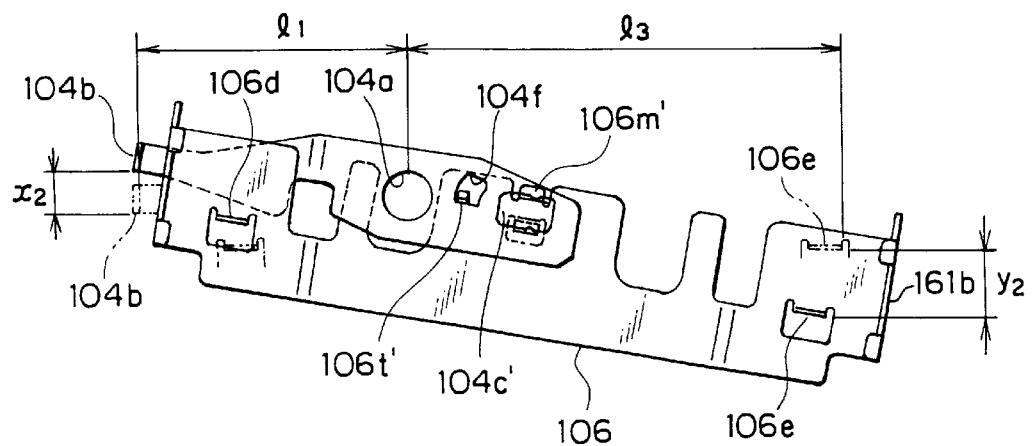
FIG. 10C

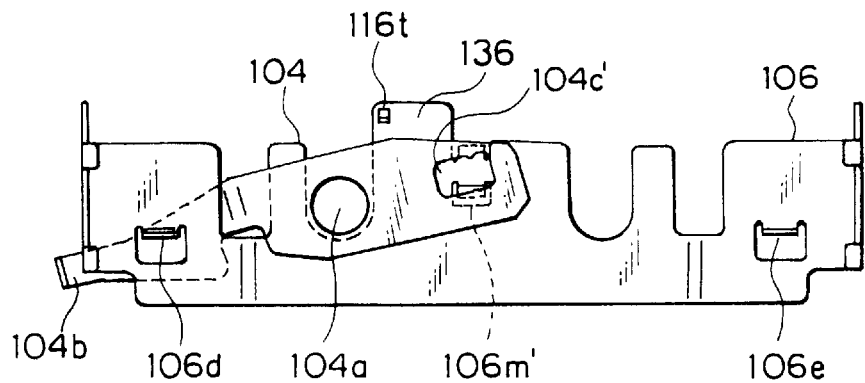
FIG. 11A
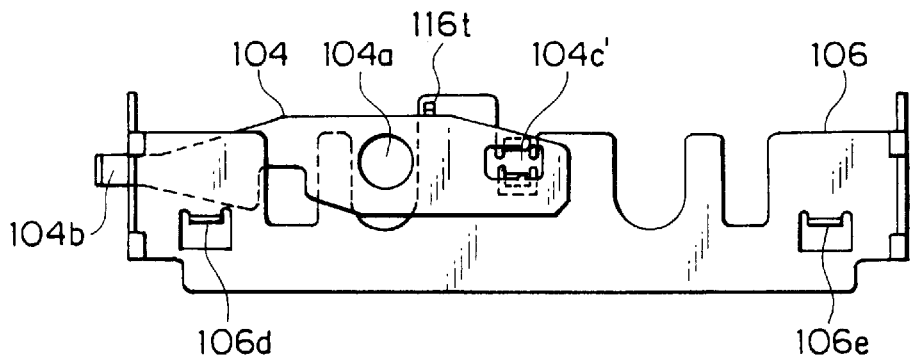
FIG. 11B
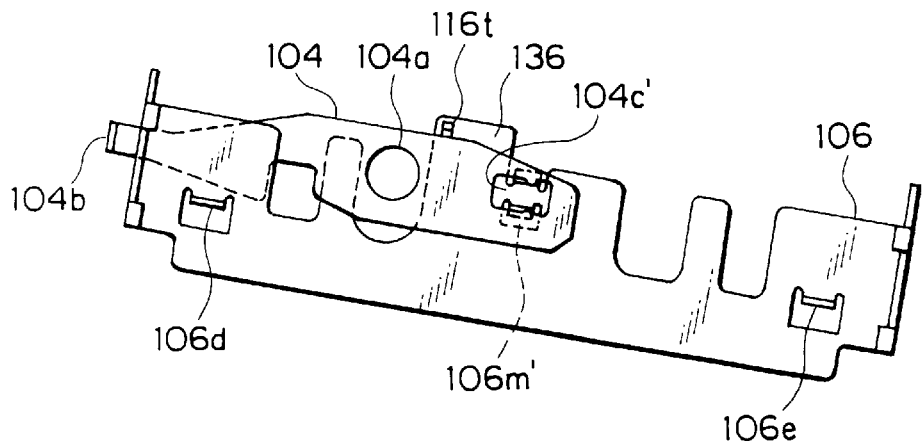
FIG. 11C

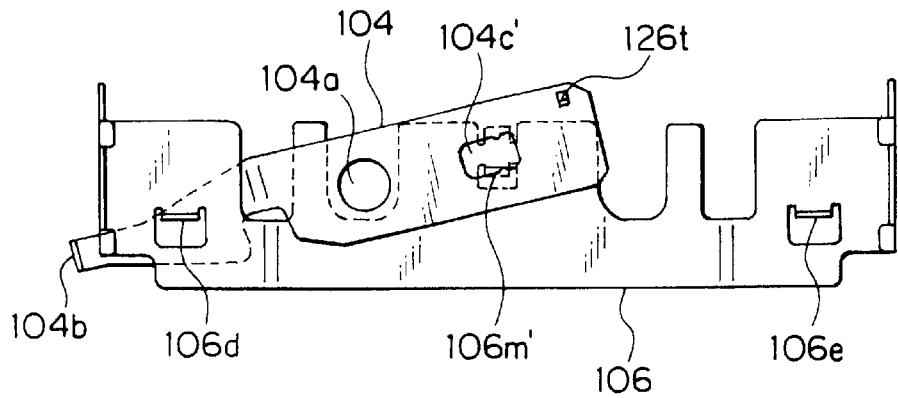
FIG. 12A
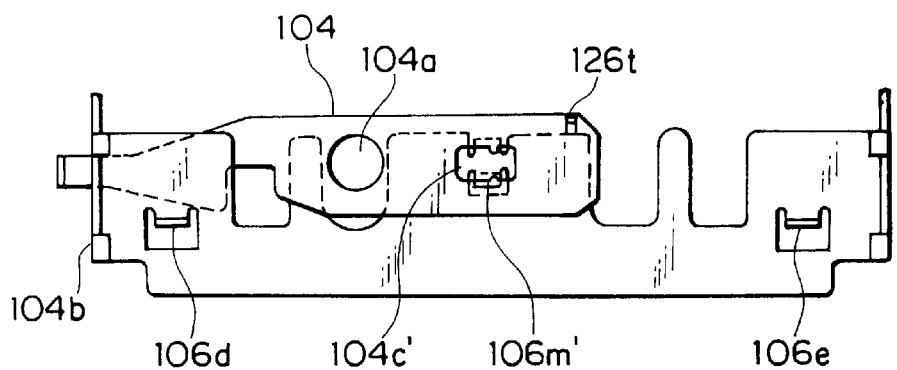
FIG. 12B
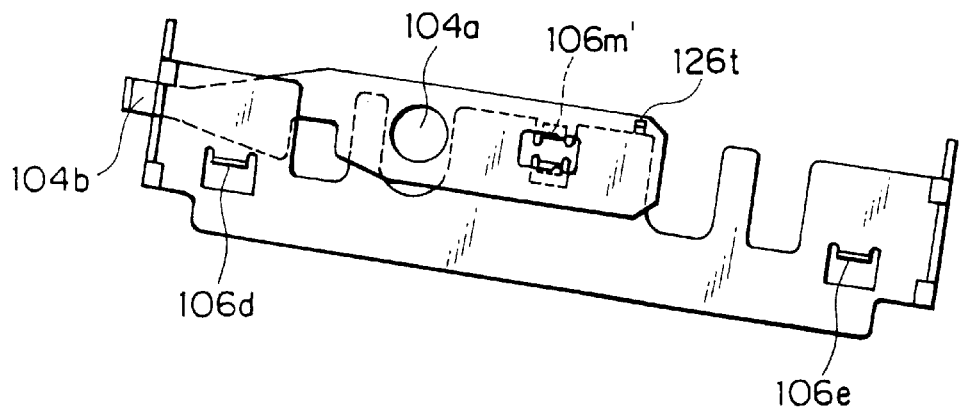
FIG. 12C

CARD CONNECTOR WITH AN EJECT MECHANISM HAVING AN INCREASED EJECT STROKE

BACKGROUND OF THE INVENTION

This invention relates to a card connector with an eject mechanism for ejecting a card and, in particular, to an improvement of the eject mechanism to increase a stroke for ejecting the card.

It is a recent trend that a portable electronic apparatus, such as a laptop or a notebook-size personal computer and a word processor, is provided with a card connector mounted on a printed circuit board (PCB) as a mother board contained therein. The card connector serves to receive a card-like object, i.e., an electronic card such as a so-called PC card in order to extend a memory capacity and to provide additional functions.

It is noted that the PC card has a size standardized by PCMCIA (Personal Computer Memory Card International Association), JEIDA (Japanese Electronic Industry Development Association), or the like. As the PC card, use has been made of various types of cards such as a memory card for extending a memory capacity, a facsimile modem card for addition of a function of facsimile transmission and reception, an I/O card for connection with a peripheral apparatus. The PC card comprises a small printed circuit board (which will hereinafter be referred to as a "card board") with electronic elements mounted thereon, and a thin plate-type housing containing the card board. The thin plate-type housing (which will hereinafter be referred to as a "card housing") is provided with a connector (which will be referred to as a "card side connector") connected to the card board. The card side connector is mated with the card connector so as to electrically connect the card board with the mother board.

A known arrangement of the card connector comprises a frame defining a card slot for receiving the PC card and having a connector portion. The connector portion is mated with the card side connector of the card received in the slot.

With a growing demand for a wider variety of additional functions provided by the PC card, development has been made of a multi-slot card connector capable of receiving a plurality of PC cards. Typically, a dual-card type is used which receives two cards simultaneously. In the dual-card type connector, the frame defins two card slots for receiving two PC cards, respectively, so that the PC cards are stacked in their thickness directions. Usually, the two card slots are not partitioned but are continuous to each other.

Generally, the card connector adopts an eject mechanism for ejecting the card, in detail, for releasing the mating condition between the card side connector and the connector portion of the card connector. The eject mechanism uses the principle of leverage.

For example, the card connector having the eject mechanism is disclosed in Japanese Unexamined Patent Publications (JP-A) Nos. 9-82411, 6-243299, and 9-115606.

It is noted here that the card connector typically has a contact stroke on the order of several millimeters. The contact stroke is a distance between a contact start position and a contact completion position. The contact start position is a position where, after the card is inserted into the slot of the frame, contact elements of the card side connector are initially brought into contact with contact elements of the connector portion of the card connector. Thereafter, the card is further pushed into the slot towards the contact completion position with frictional sliding between the contact elements of the card side connector and those of the connector portion of the card connector. Thus, complete mating or connection between the card side connector and the connector portion is established where the reliable contact is insured between contact elements of the card side connector and the corresponding contact elements of the connector portion of the card connector. The contact stroke is predetermined in design of the card connector.

In order to remove the card from the card connector, it is necessary at first to release the mating condition against the frictional force between the contact elements of the card side connector and the connector portion of the card connector. Thereafter, the card can be manually removed from the card connector. To this end, the eject mechanism comprises an eject plate slidably mounted on the frame and a lever pivotally mounted on the frame. The eject plate has fingers or detents for engaging with a forward edge of the card edge. The lever has an end slidably and rotatably engaged with the eject plate so that the eject plate is moved to slide on the frame by pivotal rotation of the lever. Thus, the card is pushed by the fingers of the eject plate to be ejected from the mating connection.

The eject mechanism is usually provided with an eject bar or rod so as to rotate the lever. The eject bar has an end which is rotatably engaged with the opposite end of the lever. The eject bar is mounted on the frame and is slidable along the frame. When the eject bar is pushed at the opposite end, it slides along the frame and rotates the lever about the pivot.

In order to eject the card from the mating condition, the eject plate must be moved by a distance which is equal to or more than the contact stroke mentioned above. The distance over which the eject plate is moved by rotation of the lever caused by operating or pushing the eject bar will be referred to as an eject stroke. A distance over which the eject bar is pushed or operated so as to realize the eject stroke through the eject lever will be referred to as an operation stroke. A force pushing the eject bar for moving the eject plate together with the card over the eject stroke through the lever will be operation force.

When the eject stroke is selected to be equal to the contact stroke, there is an actual problem that the card is often moved only a distance insufficiently to release the mating condition between the card side connector and the connector portion of the card connector.

In order to insure eject of the card from the mating condition, it is required to increase the eject stroke. To this end, one way is to use a lever having an increased length. This results in another problem that the card connector itself must have an increased size, because the lever having the increased length would project outside from an outer configure of the frame. Further, the eject bar is required to be pushed over the operation stroke increased for realizing the increased eject stroke.

Another way for increasing the eject stroke is to displace the pivoted position of the lever without increase of the length of the lever. In detail, the lever is pivoted at a point which is far away from the end engaging with the eject plate, that is, further near to the other end engaged with the eject bar. Thus, the leverage is changed so that the eject stroke is increased even if the operation stroke of the eject bar is maintained unchanged. However, the operation force is required to be increased for operating the eject bar to move the eject plate against the friction between contact elements of the card side connector and the connector portion of the card connector.

SUMMARY OF THE INVENTION

It is therefore an object of this invention to provide a card connector having an eject mechanism wherein the eject stroke is increased without increase of the operation force and without use of a lever having an increased length.

According to this invention, there is provided a card connector which is for electrically and removably connecting with a card having a mating connector portion, and which comprises (a) a frame having a slot for receiving the card, the frame comprising a pair of parallel leg portions and a bridging portion connecting the leg portions to form a U shape so that the frame has the slot having a front opening end at a side opposite to the bridging portion, the bridging portion having a connector portion to be fitted to and connected with the mating connector portion of the card received in the slot and (b) an eject mechanism for ejecting the card from a connecting condition between the connector portion and the mating connector portion, the eject mechanism comprising an eject plate mounted on the bridging portion slidable in a direction parallel to the parallel leg portions and having a pusher for engaging with the card received at a first position in the slot and being in the connecting condition, the pusher pushing the card from the first position to a second position toward the front opening end when the eject plate being driven toward the front opening end; a lever pivotally mounted on the bridging portion at a pivoted portion of the lever for driving the eject plate to move toward the front opening end, the lever having an operating portion and an engaging portion at a side opposite to the operating portion in relation to the pivoted portion; a coupling mechanism coupling the eject plate with the engaging portion of the lever while permitting relative rotation of the lever and the drive mechanism about the coupling mechanism, so that the eject plate is slid toward the front opening when the lever is rotated; and a relative rotation inhibiting mechanism mounted on the lever and the eject plate for inhibiting the relative rotation of the lever and the drive mechanism about the coupling mechanism when the lever is further rotated after the eject plate moves to a position where the card is moved to the second position, thereby further rotation of the lever enabling the eject plate together with the lever about the pivoted portion to thereby move the card from the second position to a third position toward the front opening end.

BRIEF DESCRIPTION OF THE DRAWING

FIG. 1 is a perspective view illustrating an arrangement of a known dual-card type connector;

FIGS. 2A and 2B are a plan view and a side view of another known dual-card type connector, respectively;

FIG. 3 is a sectional view taken along a line III—III in FIG. 2A;

FIG. 4 is a bottom view of an eject plate assembled with a lever in an eject mechanism in the known dual-card type connector of FIGS. 2 and 3, in a state when a card is received in the corresponding one of the slots of the card connector;

FIG. 5 is a view similar to FIG. 4, but in another state when a card is ejected;

FIG. 6 is a perspective view of a single-slot card connector according to a first embodiment of this invention when a card is inserted;

FIG. 7 is a perspective view of an eject plate and a lever illustrated in FIG. 6 as seen from a bottom side;

FIG. 8 is a perspective view similar to FIG. 6 when the card is partly ejected on the way of an eject stroke;

FIG. 9 is a perspective view similar to FIG. 7 when the card is completely ejected;

FIGS. 10A to 10C are bottom views of an eject plate and a lever in a card connector according to a second embodiment of this invention when a card is inserted, partly ejected, and completely ejected, respectively;

FIGS. 11A to 11C are bottom views of an eject plate and a lever in another card connector according to a third embodiment of this invention when a card is inserted, partly ejected, and completely ejected, respectively; and FIGS. 12A to 12C are bottom views of an eject plate and a lever in another card connector according to a fourth embodiment of this invention when a card is inserted, partly ejected, and completely ejected, respectively.

DESCRIPTION OF THE PREFERRED EMBODIMENTS

For a better understanding of this invention, description will at first be made about a known arrangement of a dual-card type connector with reference to the drawing.

Referring to FIGS. 1 through 3, the known dual-card type connector 1 is of a double-slot type and has a single frame 2 of a generally U shape having two leg portions 2a and 2b and a bridging portion 2c. The single frame 2 defines two card receiving spaces or slots 3a and 3b. The two card receiving spaces are continuous to each other and are, therefore, seen as a single space. Within the card slots 3a and 3b of the frame 2, two PC cards 18 and 19 (depicted by imaginary lines in FIGS. 1 and 2A) are received and stacked in a vertical direction in FIG. 1.

The dual-card type connector 1 has a connector portion 4 (see FIG. 3) in a bridging portion 2c of the frame 2 corresponding to a bottom of the U shape. In the connector portion 4, two sets of contact elements 4a and 4b are fixed and arranged. Those two sets of contact elements 4a and 4b are for electrically connecting the PC cards 18 and 19 received in the slots 3a and 3b to a mother board (not shown).

The frame 2 is mounted with two ground plates 7 and 8 for grounding the PC cards 18 and 19 received in the slots 3a and 3b.

In order to remove PC cards 18 and 19 from the dual-card type connector 1, the dual-card type connector 1 further comprises two first and second ejecting mechanisms 5 and 6. Each of the first and second ejecting mechanisms 5 and 6 is for ejecting each of the PC cards 18 and 19 from connection with the connector portion 4 of the frame 2, respectively.

The first ejecting mechanism 5 comprises a first lever 51 and a first eject plate 52. Likewise, the second ejecting mechanism 6 has a second lever 61 and a second eject plate 62. The first and the second ejecting mechanisms 5 and 6 are mounted on upper and lower surfaces of the frame 2, respectively. The first and the second levers 51 and 61 are coupled with first and second eject bars 53 and 63 having first and second ejecting buttons 54 and 64, respectively. The first and the second eject bars 53 and 63 are slidably mounted on the leg portions 2a and 2b of the frame 2, respectively, as shown in FIG. 1. Alternatively, the first and the second eject bars 53 and 63 can be mounted on a same leg portion 2b as shown in FIGS. 2A and 2B.

The leg portions 2a and 2b are formed with recesses 9a and 9b in their upper surfaces, respectively, and through-holes 10a and 10b extending from bottoms of the recesses 9a and 9b to the lower surfaces of the leg portions 2a and 2b, respectively. In the through-holes 10a and 10b, bolts 11 are inserted with nuts 12 threaded at their ends.

When the dual-card type connector 1 is mounted on a mother board, the nuts are removed. The bolts 11 are inserted into corresponding through-holes in the mother board and are threaded with the nuts 12 under the mother board. Thus, the mother board is clamped by the frame 2 and the nuts 12, and the connector 1 is fixedly mounted on the mother board.

Referring to FIGS. 2A and 4, the first ejecting mechanism 5 will be described. The second electing mechanism 6 is similar in structure to the first ejecting mechanism 5 and will not be described any longer.

The first lever 51 and the first eject plate 52 are arranged on the ground plate 7. The bridging portion 2c is provided at its upper surface with two pivot portions 11a and 11b penetrating the ground plate 7. The first lever 51 is attached to the pivot portion 11a. The first lever 51 has a pivot receiving hole 51a formed at a position between opposite ends. The pivot portion 11a is fitted in the pivot receiving hole 51a. The first lever 51 is rotated around the pivot portion 11a.

The first lever 51 is provided at its one end with an operating or engaging portion 51b. The operating portion 51b is rotatably engaged with or connected to the first eject bar 53. The first lever 51 is provided with an engaging hole 51c formed at its opposite end opposite to the operating portion 51b. The first eject plate 52 has an engaging projection 52m formed at its center to be slidably engaged with the engaging hole 51c. The first lever 51 is also rotatable about the engaging projection 52m relatively to the first eject plate 52. On the other hand, the first eject plate 52 is rotatable about the engaging projection 52m on the first lever 51. The first eject plate 52 has two fingers 52d and 52e for engaging with a forward edge of the card 18 received in the slot so as to eject the card 18 by sliding movement of the first eject plate 52 caused by rotation of the first lever 51 about the pivot 11b.

FIGS. 4 and 5 show the first lever 51 and the first eject plate 52 when the card 18 is inserted in the card connector 1 and when the card 18 is ejected from the mating condition of the card 18 with the connector portion 4 of the card connector 1, respectively.

When the eject bar 53 in FIG. 2A is slid along an outer side surface of the leg portion 2b, the end of the first eject bar 53 pushes the operating portion 51b of the first lever 51 to rotate the first lever 51. Simultaneously, the opposite end of the first lever 51 moves the first eject plate 52, as illustrated in FIG. 5. As a result, the fingers 52d and 52e of the first eject plate 52 pushes the card 18 to eject the card 18.

In the above-mentioned card connector 1, the ejecting force between 1 and 4 kg is sufficient to eject the card 18. Therefore, the eject mechanism 5 using the principle of leverage is adopted.

Generally, the card 18 and the card connector 1 has the contact stroke on the order of 4 mm. Specifically, the card 18 has a conductive socket portion as a contacting portion of each contact elements (not shown). On the other hand, the connector portion 4 has a contacting portion of each of the contact elements 4a illustrated in FIG. 3. The contact elements 4a are received in the socket portion to achieve mutual contact therebetween. Herein, the contact stroke is a distance between a contact start position and a contact completion position where the contact between the socket portion of the card 18 and the contact elements 4a of the connector portion 2 is started and completed, respectively.

Upon an ejecting operation by the eject mechanism 5, the operating portion 51b of the first lever 51 is applied with a load or the operation force F1, actually through the eject bar 53. In response to the load, the first lever 51 is rotated over a range or the operation stroke shown at x in FIG. 5. Since the engaging hole 51c is engaged with the engaging projection 52m of the first eject plate 52, the first eject plate 52 is applied with a load or an ejecting force F2. Following the rotation of the first lever 51, the first eject plate 52 performs parallel movement in a range or the eject stroke shown at y in FIG. 5. In this state, the contacting portion of the card 18 and the contact elements 4a of the connector portion 4 are moved with respect to each other within the range of the contact stroke. Herein, the load applied to the first eject plate 52 and the eject stroke are determined by the leverage of the first lever 51. Specifically, the leverage of the first lever 51 is obtained as x:y=L1:L2 where L1 and L2 represent the length of a part of the first lever 51 between the pivot receiving hole 51a and the operating portion 51b and the length of the other part between the pivot receiving hole 51a and the engaging hole 51c, respectively, as illustrated in FIG. 5. On the other hand, the ejecting force F2 is determined by the operation force F1 and the leverage and is given by the following formula: $F1 \times L1 = F2 \times L2$.

Thus, the eject mechanism 5 of the conventional card connector 1 has the problem as described in the preamble.

Now, several preferred embodiments of this invention will be described in conjunction with card connectors of a single-slot type. However, it will be understood from the following description of the preferred embodiments by those skilled in the art that the present invention can be applied to the card connector of the dual-card type as shown in FIGS. 1 through 3.

Referring to FIGS. 6 and 7, a card connector 100 of a single-slot type according to a first embodiment of this invention comprises a frame 101 with a lever 104 and an eject plate 106 attached thereto. In FIG. 6, a card 180 is inserted into the card connector 100.

The frame 101 has a U shape with an opening formed at one end thereof. The frame 101 is made from a thermoplastic resin material. The frame 101 comprises a pair of leg portions 101A and 101B extending in parallel to each other and a bridging portion 108 connecting the leg portions 101A and 101B. The bridging portion 108 has a connector portion 102 forming a part thereof. The connector portion 102 is integrally formed with the bridging portion 108 by resin molding.

A combination of the bridging portion 108 and the leg portions 101A and 101B defines an internal cavity as a slot 100a for receiving the card 180. Alternatively, the bridging portion 108 may be formed to be combined with the connector portion 102 as a separate component.

The connector portion 102 has two pivot portions 103a and 103b formed on its upper surface to pivotally support the lever 104 by one of the two pivot portions 103a and 103b. In the card connector 100 illustrated in FIG. 6, the lever 104 is attached to the pivot portion 103a on the left side in the figure. Alternatively, the lever 104 can be attached to the pivot portion 103b on the right side in the figure when the lever 104 is changed in position from the left side to the right side.

The lever 104 has a pivot receiving hole 104a formed at a predetermined position in its longitudinal direction. The pivot portion 103a is fitted in the pivot receiving hole 104a. The lever 104 is rotatable around the pivot portion 103a. After the lever 104 is coupled to the pivot portion 103a, the eject plate 106 is mounted on the top end of the lever 104 and the upper surface of the connector portion 102. The bridging portion 108 has a wall portion 108a to face one sides of the eject plate 106 and the lever 104.

The leg portions 101A and 101B are provided with guide grooves 110a and 101b formed on confronting surfaces thereof, respectively, for insertion of the card 180. The operating portion 104b of the lever 104 is coupled to an eject bar 109 similar to the first eject bar 53 illustrated in FIG. 2B. The lever 104 is provided with an engaging hole 104c formed at its opposite end opposite to the one end (FIG. 7). At the engaging hole 104c, the lever 104 is engaged with the eject plate 106 as will later be described. The engaging hole 104c has an elongated shape extending in a longitudinal direction of the lever 104.

The eject plate 106 has two fingers 106d and 106e as a pusher formed in the vicinity of both side edges thereof. The fingers 106d and 106e serve to eject the card 180 in an ejecting direction depicted by an arrow I in FIG. 6. Herein, a direction depicted by another arrow II opposite to the ejecting direction I will be called an inserting direction. These fingers 106d and 106e are formed by partially cutting and bending the eject plate 106 in a thickness direction.

The eject plate 106 has two guide slots 106g and 106h formed inward of the fingers 106d and 106e, and two pairs of engaging projections 106m and 106n formed at two positions between the guide slots 106g and 106h. The guide slots 106g and 106h serve to receive the two pivot portions 103a and 103b when the eject plate 106 is moved as guided by the pivot portions 103a and 103b received in the guide slots 106g and 106h.

Each of the guide slots 106g and 106h is opened at the side of the bridging portion 108 and has a U-shaped contour. The engaging projections 106m and 106n are also formed by partially cutting and bending the eject plate 106 to protrude therefrom in the thickness direction. Each of the engaging projections 106m and 106n has a first part extending in parallel to the fingers 106d and 106e and a second part connected to the first part to extend in parallel to the surface of the eject plate 106.

The engaging projections 106m are inserted in the engaging hole 104c so that that the engaging projections 106m are engaged with the edge of the engaging hole 104c. Thus, the eject plate 106 is coupled with the lever 104 so that relative rotation is permitted between the eject plate 106 and the lever 104.

Between the guide slot 106g and the engaging projections 106m, a stopper projection 106t is formed in the vicinity of the engaging projection 106m.

The stopper projection 106t is located in the engaging hole 104c.

The engaging projections 106n are used when the lever 104 is attached to the pivot portion 103b on the right side in FIG. 6. In this case, the stopper projection 106t is formed on the right side corresponding to the engaging hole 104c of the lever 104.

In the first embodiment, the engaging projections 106m and 106n are formed at two positions of the eject plate 106. Alternatively, the engaging projections 106m alone may be formed at a longitudinal center of the eject plate 106. Such structure will later be described in conjunction with second through fourth embodiments.

The eject plate 106 is bent at both ends to form a pair of guide portions 161a and 161b. The guide portions 161a and 161b are in sliding contact with opposite sides of the frame 101 and guide the eject plate to move on the frame 101 in the ejecting direction I and the inserting direction II. The guide portions 161a and 161b are provided with guide holes 162a and 162b, respectively, elongated in the ejecting direction I and the inserting direction II.

The outer side surfaces 121a and 121b of the bridging portion 108 are provided with guide projections 115a and 115b protruding outward therefrom, respectively. The guide projections 115a and 115b are slidably fitted into the guide holes 162a and 162b of the guide portions 161a and 161b, respectively.

As illustrated in FIGS. 6 through 9, the frame 101 has joint portions 111A and 111B. The joint portion 111A extends between the outer side surface 121a with the guide projection 115a and the leg portion 101A. The joint portion 111B extends between the outer side surface 121b with the guide projection 115b and the leg portion 101B. The joint portions 111A and 111B have inclined surfaces 125a and 125b as their outer surfaces. The inclined surfaces 125a and 125b inwardly incline the ejecting direction I from the outer side surfaces 121a and 121b to the leg portions 101A and 101B. The guide projections 115a and 115b are located near to the inclined surfaces 125a and 125b, respectively.

The lever 104 is arranged so that a part of the lever 104 having the pivot receiving hole 104a and the engaging hole 104c faces the bottom surface of the eject plate 106. An intermediate portion of the lever 104 passes through a corresponding one of cut grooves 163a and 163b formed in the eject plate 106. The other part of the lever 104 from the pivot receiving hole 104a to the operating portion 104b is located on the upper surface of the eject plate 106. The operating portion 104b has a generally U shape and is located on the side of guide portion 161a. The operating portion 104b is coupled to one end of the eject bar 109.

The eject bar 109 and the leg portion 101A of the frame 101 are similar in structure to those of the conventional card connector illustrated in FIG. 1 and will not be described in detail.

FIGS. 6, 8, and 9 show first through third states of the lever 104 and the eject plate 106 where the card 180 is received, partly ejected on the way of the ejecting operation, and completely ejected, respectively.

In the manner similar to that described in conjunction with the conventional card connector in FIG. 1, when the eject bar 109 is pushed to slide along the outer side surface of the leg portion 101A of the frame 101 in the inserting direction II, the eject bar 109 forces the lever 104 to rotate. As a result, the card 180 received in the slot 100a of the frame 101 is pushed out and ejected.

The ejecting operation of the card 180 is carried out in the following manner.

Referring to FIG. 6, the card 180 is received in the slot 100a and the contacting portion of the card 180 and the connector portion 102 are completely connected to each other. In this state, the operating portion 104b is located on the side of the joint portion 111A of the leg portion 101A. When the eject bar 109 is linearly moved in the inserting direction II, the operating portion 104b is pushed by the end of the eject bar 109 to rotate the lever 104. The eject plate 106 is pushed in the ejecting direction I because the engaging projections 106m are pushed by an edge of the engaging hole 104c of the lever 104. When the stopper projection 106t comes into contact with the edge of the engaging hole 104c of the lever 104 as shown in FIG. 8, each of the guide projections 115a and 115b is located at an approximate center of each of the guide holes 162a and 162b. A distance over which the eject plate 106 is moved in a first transition from the first or initial state of FIG. 6 to the second or intermediate state of FIG. 8 will be referred to as a first moving distance.

The first moving distance is determined by the leverage of the lever 104 and a moving range of the operating portion 104b of the lever 104, as will be understood from description in connection with FIG. 5. On the other hand, it should be noted that the leverage of the lever 104 determines the operation force F1 to be applied to the operating portion 104b so as to move the eject plate 106 together with the card 180 against the friction of the contact elements of the card and the connector portion.

The leverage of the lever 104 is predetermined so that the first moving distance is equal to or slightly larger than the contact force of the card connector 100, considering that the operation force should be proper or reasonable. Further, a position of the stopper projection 106t relative to the pivot portion 103a and the engaging hole 104c is also predetermined considering the leverage of the lever 104 and the first moving distance.

When the stopper projection 106t is abutted to the edge of the engaging hole 104c of the lever 104, the lever 104 and the eject plate 106 are fixed to each other and therefore are inhibited from relative rotation for further rotation of the lever 104. Thus, the engagement of the stopper projection 106t and the edge of the engaging hole 104c functions as a relative rotation inhibiting mechanism.

In the second or intermediate state illustrated in FIG. 8, a part of a peripheral edge of the lever 104 is in contact with the wall surface 108a of the bridging portion 108.

In the second state of the FIG. 8, when the eject bar 109 is further pushed, the lever 104 is further rotated. At the time, the eject plate 106 is also rotated together with the lever 104. This is because the lever 104 and the eject plate 106 are inhibited from relative rotation by engagement of the stopper projection 106t and the edge of the engaging hole 104c as described above. Thus, the eject plate 106 is inclined as shown in FIG. 9 and further pushes the card 180 by the other finger 106e of the eject plate 106. Thus, the card 180 is further moved by a distance which will be referred to as a second moving distance.

It should be noted here that a transmission leverage through which the operation force applied to the operating portion 104b is transmitted to the card 180 is changed. That is, the transmission leverage in the first transition from the initial state of FIG. 6 to the intermediate state of FIG. 8 is the leverage of the lever 104. However, the transmission leverage in a second transition from the intermediate state of FIG. 8 to the final state of FIG. 9 is a changed leverage which is given by a ratio between a distance from the operating portion 104b of the lever 104 to the center of the pivot receiving hole 104a and another distance from the center of the pivot receiving hole 104a to the other finger 106e formed on the eject plate 106. Thus, the second moving distance is determined by the changed leverage and a further operating range of the operating portion 104b in the transition from the intermediate state to the final state. A further operation force to be applied to the operating portion 104b so as to realize the second moving distance is also dependent on the changed leverage and a further ejecting force required to further push the card 180 by the other finger 106e. The second transition is performed after the card 180 has already been moved over the contact stroke. Therefore, it is sufficient that the further ejecting force is both far small in comparison with the initial transition. Therefore, it can be determined that the further operation force is also very small.

By the first and second transitions from the initial state to the final state, the eject stroke is a sum of the first moving distance and the second moving distance. In the final state of FIG. 9, the card 180 has, therefore, reliably been moved over the contact stroke and is completely ejected from the connection of the card 180 and the contact portion. The other guide projection 115b is located at the forward end of the guide hole 162b in the inserting direction II. The eject plate 106 is displaced in the inclined position. At this time, the forward end of the guide portion 161b in the ejecting direction I is brought into contact with an end face of the leg portion 101B.

The guide portion 161b is inclined along the inclined surface 125b of the joint portion 111B. Thus, the inclined surface 125b serves to keep a predetermined inclination angle when the guide portion 161b is displaced to the inclined position.

Referring to FIGS. 10A through 10C, a card connector 100 according to a second embodiment of this invention has an eject mechanism illustrated in the figures. FIGS. 10A through 10C show the first through the third states of the eject plate 106 and where the card 180 is received, partly ejected on the way of the ejecting operation, and completely ejected, respectively. The second embodiment is similar to the first embodiment except that the eject plate 106 and the lever 104 are slightly different in structure.

In the second embodiment, the eject plate 106 has a single engaging projection 106m' formed at a position in a portion between the opposite ends. The engaging portion 106m' is engaged with an engaging hole 104c' of the lever 104. The lever 104 is provided with an additional engaging hole 104f in the vicinity of the engaging hole 104c'. In the additional engaging hole 104f, a stopper projection 106t' formed by cutting and bending a small part of the eject plate 106 is located.

In FIG. 10A, the engaging hole 104c in FIG. 7 is divided into the engaging hole 104c' and the additional engaging hole 104f.

The engaging hole 104c' and the additional engaging hole 104f are basically similar in function to that described in conjunction with the eject mechanism of the first embodiment. In the following, the ejecting operation of the second embodiment will be described with reference to FIGS. 10A through 10C. The operation is generally similar to that described in connection with FIGS. 6 through 9 of the first embodiment. Therefore, the different operation will mainly be described below.

Referring to FIG. 10A, the eject plate 106 is located at a position corresponding to the first state where the card 180 is received, like in FIG. 6. In FIG. 10B, the eject plate 106 is located at another position corresponding to the second state where the card 180 is partly ejected on the way of the ejecting operation. In the transition from the first state to the second state, the lever 104 is moved by an operating range shown at x1, while the eject plate 106 moves the first moving distance shown at y1 in the figure. The relation the leverage of the lever 104, the range x1 and the first moving distance y1 is given by x1:y1=L1:L2, where L1 and L2 represent the distance between the pivot receiving hole 104a' and the operating portion 104b and the distance between the center of the pivot receiving hole 104a' and the engaging hole 104c', respectively.

In the state illustrated in FIG. 10B, the stopper projection 106t' of the eject plate 106 is in contact with or engages with the edge of the additional engaging hole 104f of the lever 104. Thus, the stopper projection 106t' serves to inhibit the relative rotation between the lever 104 and the eject plate 106 for the further rotation of the lever 104.

In the second state illustrated in FIG. 10B, a part of the peripheral edge of the lever 104 is in contact with the wall surface 108*a* of the bridging portion 108.

In the second state of FIG. 10B, when the eject bar 109 is further pushed, the lever 104 is further rotated and therefore, the eject plate 106 is also rotated together with the lever 104 to the inclined position as shown in FIG. 10C. Therefore, the transmission leverage is changed in to an changed leverage, like in FIGS. 8 through 9.

Referring to FIG. 10C, the changed leverage is represented by a ratio between the distance L1 from the operating portion 104*b* of the lever 104 to the center of the pivot receiving hole 104*a* and another distance L3 from the center of the pivot receiving hole 104*a* to the other finger 106*e* formed on the eject plate 106. By the transition from the second state of FIG. 10B to the third state of FIG. 10C, the lever 104 is moved in a range x2 while the plate 106 is moved in a range y2.

A relation of x2, y2 and the changed leverage of L1/L3 is given by x2:y2=L1:L3.

In the third state where the card 180 is completely ejected, the guide projection 115*b* is located at the forward end of the guide hole 162*b* in the inserting direction II. The eject plate 106 performs rotating movement to be displaced to the inclined position. At this time, the forward end of the guide portion 161*b* in the inserting direction II is brought into contact with the end face of the leg portion 101B.

Referring to FIGS. 11A through 11C, a card connector 100 according to a third embodiment of this invention has an eject mechanism illustrated in the figures.

FIGS. 11A through 11C shows the first through the third states of the lever 104 and eject plate 106 where the card 180 is inserted, partly ejected, and completely ejected.

The third embodiment is similar to the second embodiment except that the eject plate 106 and the lever 104 are slightly modified in structure.

Referring to FIG. 11A, the eject plate 106 is provided with an additional plate portion 136 located between the engaging hole 104*c*' and the pivot receiving hole 104*a* of the lever 104 and extending in the inserting direction II. The additional plate portion 136 has a stopper projection 116*t* instead of the stopper projection 106*t*' in FIG. 10A. The stopper projection 116*t* serves to inhibit relative rotation of the lever 104 and the eject plate 106. Therefore, the lever 104 does not have the additional engaging hole 104*f* in FIG. 10A.

The states illustrated in FIGS. 11A and 11B are similar to those in FIGS. 10A and 10B, respectively. That is, the eject plate 106 is moved over the first moving distance by the transition of the first state to the second states due to the operation of the lever 104.

In the second state illustrated in FIG. 11B, the edge of the lever 104 is in contact with the stopper projection 116*t* or located in close proximity thereto. Next, when the operating portion 104*b* is further pushed by the eject bar 109, the lever 104 and the eject plate 106 are fixed to each other.

When the lever 104 is further applied with the load, the stopper projection 116*t* is pushed by the peripheral edge of the lever 106 so that the eject plate 106 is rotated together with the lever 104 as illustrated in FIG. 11C. The leverage is changed in the similar manner to that described in conjunction with FIG. 10C.

Referring to FIGS. 12A through 12C, a card connector 100 according to a fourth embodiment of this invention has an eject mechanism illustrated in the figures.

FIGS. 12A through 12C shows the first through the third states of the lever 104 and the eject plate 106 where the card 180 is inserted, partly ejected, and completely ejected, respectively.

The fourth embodiment is similar to the second embodiment except that the eject plate 106 and the lever 104 are slightly modified in structure.

Referring to FIG. 12A, the lever 104 is provided at the opposite end with a stopper projection 126*t* instead of the stopper projection 106*t*' in FIG. 10A. In the first state, the stopper projection 126*t* is apart from the edge of the eject plate 106. In the second state, the stopper projection 126*t* is in contact with the edge of the eject plate to thereby inhibit relative rotation of the lever 104 and the eject plate 106 for further rotation of the lever 104. Therefore, the lever 104 does not have the additional engaging hole 104*f* in FIG. 10A.

The states illustrated in FIGS. 12A and 12B are similar to those in FIGS. 10A and 10B. That is, the eject plate 106 is moved over the first moving distance by the transition form the first state to the second state in response to the operation of the lever 104.

In the state illustrated in FIG. 12B, the edge of the eject plate 106 is engage with the stopper projection 126*t* of the lever 104 or located in close proximity thereto. Next, when the operating portion 104*b* is further pushed by the eject bar 109, the stopper projection 126*t* interferes with the eject plate 106 so that the lever 104 and the eject plate 106 are rotated together with each other. Thus, the eject plate 16 is inclined in the third state, as shown in FIG. 12C. The leverage is similar to that described in conjunction with FIG. 10C.

As described above, in the card connector according to each of the first through the fourth embodiments of this invention, the ejecting operation in the initial stage is carried out over the contact stroke with the operation force and stroke equivalent to that in the prior art. In the next stage of the ejecting operation, the eject plate 106 is rotated integrally with the lever 104 to increase the leverage. It is therefore possible to carry out the further ejecting operation over relatively large moving distance with low operating distance and operation force. Thus, the ejection stroke is increased in comparison with the prior art so that it is possible to realize the reliable and sufficient ejection of the card 180 from connection with the card connector with a relatively low operation force and distance without increase of the size of the card connector.

What is claimed is:

1. A card connector for electrically and removably connecting with a card (180) having a mating connector portion, said card connector comprising:

a frame (101) having a slot (100*a*) for receiving said card (180), said frame (101) comprising a pair of parallel leg portions (101A, 101B) and a bridging portion (108) connecting the leg portions (101A, 101B) to form a U shape so that said frame (101) has said slot (101*a*) having a front opening end at a side opposite to said bridging portion (108), said bridging portion (108) having a connector portion (102) to be fitted to and connected with said mating connector portion of said card (180) received in said slot (100*a*); and an eject mechanism for ejecting said card (180) from a connecting condition between said connector portion (102) and said mating connector portion, said eject mechanism comprising:

an eject plate (106) mounted on said bridging portion (108) slidable in a direction parallel to said parallel leg portions (101A, 101B) and having a pusher (106d, 106e) for engaging with said card (180) received at a first position in said slot (101a) and being in said connecting condition, said pusher (106d, 106e) pushing said card (180) from the first position to a second position toward said front opening end when said eject plate (106) being driven toward said front opening end;

a lever (104) pivotally mounted on said bridging portion at a pivoted portion (104a) of said lever for driving said eject plate (106) to move toward said front opening end, said lever (104) having an operating portion (104b) and an engaging portion (104c) at a side opposite to said operating portion in relation to said pivoted portion;

a coupling mechanism (104c, 106m) coupling said eject plate (106) with said engaging portion of said lever (104) while permitting relative rotation of said lever and said drive mechanism about said coupling mechanism, so that said eject plate is slid toward said front opening when said lever is rotated; and a relative rotation inhibiting mechanism mounted on said lever and said eject plate for inhibiting the relative rotation of said lever and said drive mechanism about said coupling mechanism when said lever is further rotated after said eject plate moves to a position where said card is moved to the second position, thereby further rotation of said lever (104) enabling said eject plate (106) together with said lever (104) about said pivoted portion (103a) to thereby move said card (180) from said second position to a third position toward said front opening end.

2. A card connector as claimed in claim 1, wherein said pusher comprises a plurality of fingers (106d, 106e); a pivot (103a) is fixedly mounted on said bridging portion (108);

said lever is formed with a pivot receiving hole (104a) at said pivoted portion, said pivot (103a) being received in said pivot receiving hole (104a); and said coupling mechanism comprises an engaging projection (106m) and an engaging hole (104c) engaging with said engaging projection (106m) formed on one and the other of said eject plate (106) and said engaging portion of said lever (104), respectively.

3. A card connector as claimed in claim 2, wherein:

said coupling mechanism comprises said engaging hole (104c) formed on an opposite end of said lever (104) and said engaging projection (106m) formed on said eject plate (106) to protrude in a thickness direction into said engaging hole (104c); and said relative rotation inhibiting mechanism (106t) comprises a stopper projection (106t) formed on said eject plate (106) to protrude in a thickness direction into said engaging hole (104c) so that said stopper projection (106t) interferes with the edge of said engaging hole (104c) to prevent further relative rotation of said lever (104) relative to said eject plate (106) when said eject plate (106) moves to the position where said card is moved to the third position.

4. A card connector as claimed in claim 2, wherein:

said coupling mechanism comprises said engaging hole (104c') formed on the opposite end of said lever (104), an additional engaging hole (104f) formed on said lever (104) between said engaging hole (104c') and said pivot receiving hole (104a), and said engaging projection (106m') formed on said eject plate (106) to protrude in a thickness direction into said engaging hole (104c');

said relative rotation inhibiting mechanism (106t) comprising a stopper projection (106t') formed on said eject plate (106) to protrude in a thickness direction into said additional engaging hole (104f) so that said stopper projection (106t') interferes with the edge of said additional engaging hole (104f) to prevent further relative rotation of said lever (104) relative to said eject plate (106) when said eject plate (106) moves to the position where said card is moved to the third position.

5. A card connector as claimed in claim 2, wherein:

said coupling mechanism comprises said engaging hole (104c') formed on the engaging portion of said lever (104), an additional engaging hole (104f) formed on said lever (104) between said engaging hole (104c') and said pivot receiving hole (104a), and said engaging projection (106m') formed on said eject plate (106) to protrude in a thickness direction into said engaging hole (104c');

said eject plate (106) being provided with an additional plate portion (136) formed adjacent thereto;

said relative rotation inhibiting mechanism (106t) comprising a stopper projection (116t) formed on said additional plate portion (136) to protrude in a thickness direction into said additional engaging hole (104f) so that said stopper projection (116t) interferes with the edge of said additional engaging hole (104f) to prevent further relative rotation of said lever (104) relative to said eject plate (106) when said eject plate (106) moves to the position where said card is moved to the third position.

6. A card connector as claimed in claim 2, wherein:

said coupling mechanism comprises said engaging hole (104c') formed on the opposite end of said lever (104) and said engaging projection (106m') formed on said eject plate (106) to protrude in a thickness direction into said engaging hole (104c');

said relative rotation inhibiting mechanism (106t) comprising a stopper projection (126t) formed on the opposite end of said lever (104) to protrude in a thickness direction so that said stopper projection (126t) interferes with the edge of said eject plate (106) to prevent further relative rotation of said lever (104) relative to said eject plate (106) when said eject plate (106) moves to the position where said card is moved to the second position.

7. A card connector as claimed in claim 1, wherein said bridging portion (108) has outer side surfaces (121a, 121b) on both sides thereof in parallel to each other;

said eject plate (106) having guide portions (161a, 161b) faced to said outer side surfaces (121a, 121b) to guide parallel movement of said eject plate (106), said guide portions (161a, 161b) having guide holes (162a, 162b) elongated in a moving direction of said eject plate (106), respectively;

said outer side surfaces (121a, 121b) being provided with guide projections (115a, 115b) slidably engaged with said guide holes (161a, 161b), said bridging portion (108) and said leg portions (101A, 101B) being connected via joint portions provided with inclined surfaces (125a, 125b) for guiding said eject plate (106) which performs rotating movement around said pivot receiving hole to the position corresponding to the third position when said lever (104) is applied with a further load after said eject plate performs parallel movement to reach the position corresponding to the second position.

* * * * *

UNITED STATES PATENT AND TRADEMARK OFFICE
CERTIFICATE OF CORRECTION

PATENT NO. : 6,056,566
DATED : May 2, 2000
INVENTOR(S) : Keisuke Nakamura, Akira Kimura It is certified that error appears in the above-identified patent and that said Letters Patent is hereby corrected as shown below:

Fig. 7, delete "1061a" and insert --161a--

Column 1, Line 46, delete "defins" and insert --defines--

Column 2, Line 47, delete "eject" and insert --ejection--

Column 9, Line 64, delete "both far" and insert --very--

Column 11, Line 52, delete "second states" and insert --second state--

Column 12, Line 28, delete "16" and insert --106--

Signed and Sealed this

Third Day of April, 2001

*Attest:*

NICHOLAS P. GODICI

*Attesting Officer*     *Acting Director of the United States Patent and Trademark Office*